UNITED STATES PATENT OFFICE.

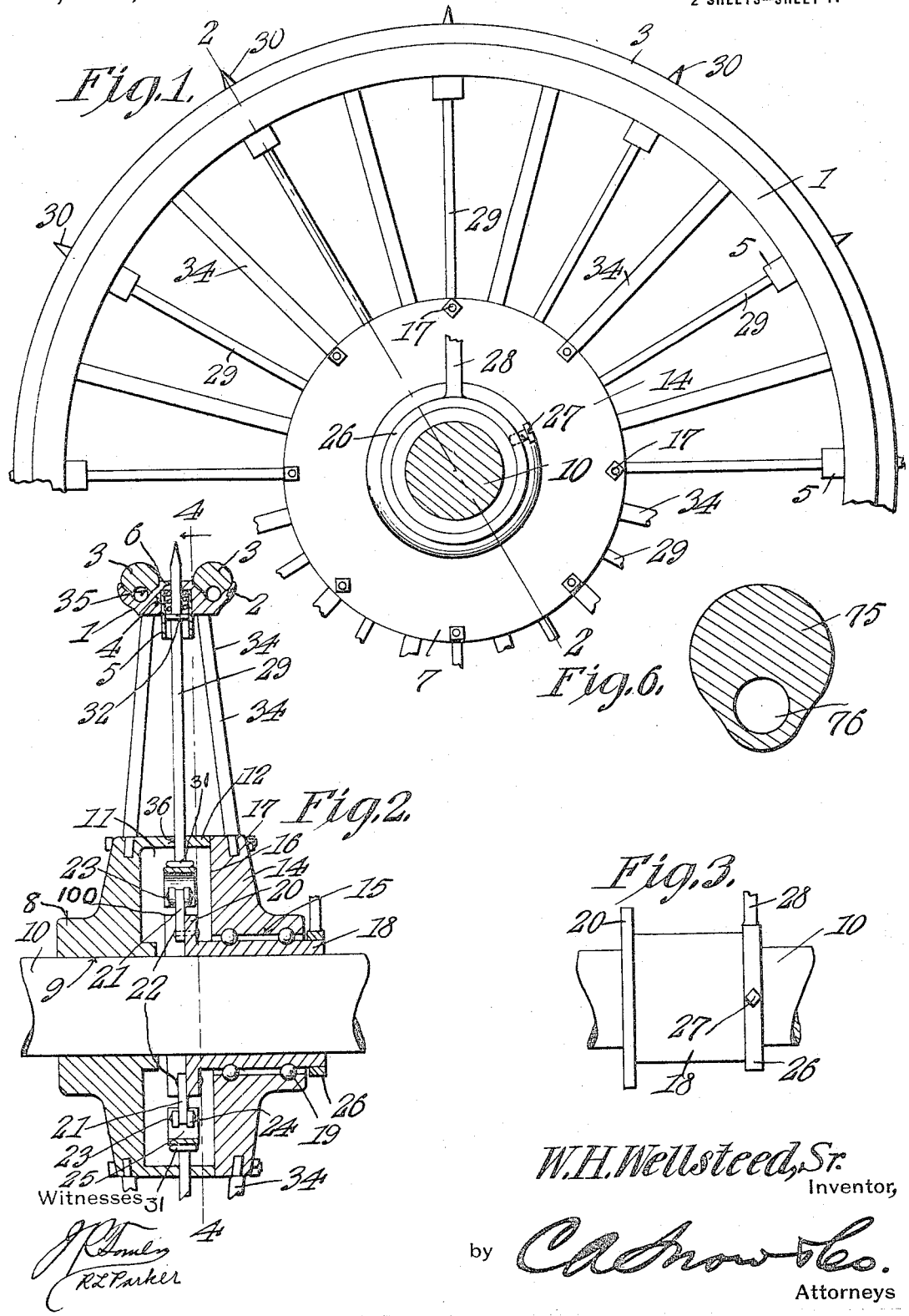

WILLIAM H. WELLSTEED, SR., OF BRAMPTON, MICHIGAN.

WHEEL.

1,210,580.　　　　　Specification of Letters Patent.　　　Patented Jan. 2, 1917.

Application filed July 7, 1916.　Serial No. 107,954.

*To all whom it may concern:*

Be it known that I, WILLIAM H. WELLSTEED, Sr., a citizen of the United States, residing at Brampton, in the county of Delta and State of Michigan, have invented a new and useful Wheel, of which the following is a specification.

The device forming the subject matter of this application is a traction wheel, and one object of the invention is to provide novel means for controlling the traction rods which slide radially in the wheel.

Another object of the invention is to improve the hub portion of the wheel, to enable the same to receive and accommodate the means whereby the traction rods are controlled.

Another object of the invention is to improve the tire portion of the wheel.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 4:
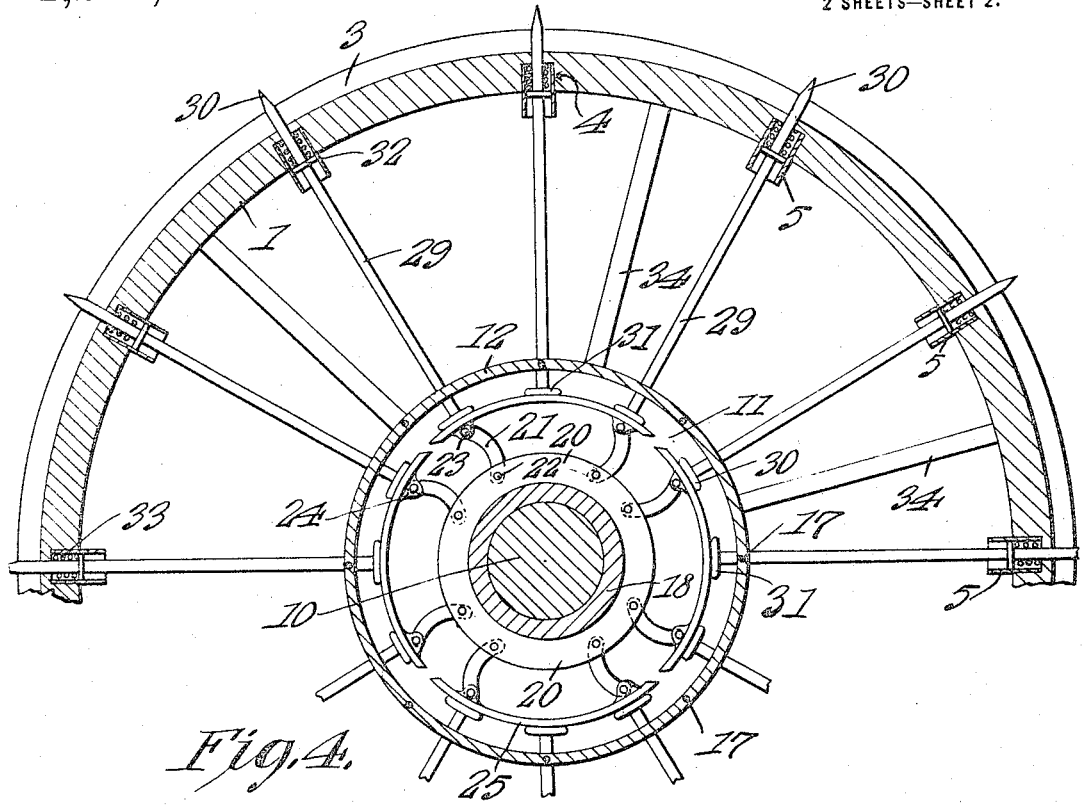
Figure 5:
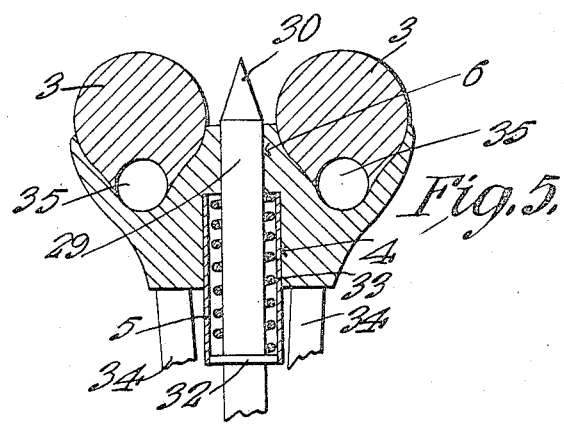

In the accompanying drawings: Figure 1 shows in side elevation, a portion of a wheel equipped with the device forming the subject matter of this application, the axle appearing in section; Fig. 2 is a section taken approximately on the line 2—2 of Fig. 1; Fig. 3 is a side elevation showing the actuating sleeve mounted in place on the axle; Fig. 4 is a section taken approximately on the line 4—4 of Fig. 2; and Fig. 5 is a detail enlarged from Fig. 2. Fig. 6 is a fragmental cross section showing a slight modification in one of the tires.

In carrying out the present invention there is provided a rim 1 having circumscribing grooves 2 receiving tires 3. The tires 3 may be made of rubber or any other suitable material and may be equipped, if desired, with circumferential passages 35 located adjacent the rim 1. In the rim 1, between the tires 3, radial recesses 4 are formed. Mounted in the recesses 4 are thimbles 5 which preferably are made of metal. Reduced passages 6 lead from the periphery of the rim 1 into the recesses 4.

The numeral 7 designates generally a hub including a side plate 8 having a bore 9 conforming closely to the exterior diameter of an axel 10, the side plate 8 ordinarily being mounted to rotate on the axle. In the inner face of the side plate 8 there is formed an annular chamber 11 defining an overhanging flange 12 at the periphery of the side plate.

At 14 there appears a side plate constituting a part of the hub 7. The side plate 14 has a bore 15 which is of appreciably larger diameter than the axle 10. A chamber 16 is fashioned in the inner face of the side plate 14, the chamber 16 being complemental to the chamber 11 in the side plate 8. The side plates 14 and 8 may be united adjacent their peripheries by securing elements 17 which may be bolts.

Mounted for rotation at the will of an operator on the axle 10 and located in the bore 15 of the side plate 14 is a sleeve 18. Balls 19 may be interposed between the sleeve 18 and the side plate 14, any means known in the art being employed for facilitating the placing of the balls. This detail is not shown in the present application, because a wheel of this type cannot be characterized patentably by any kind of a ball bearing. The inner end of the sleeve 18 is provided with an annular flange 20 located in the chamber 11 of the side plate 8.

Links 21 are pivoted as shown at 22 to the flange 20 of the sleeve 18. The outer ends of the links 21 are pivoted as indicated as 23, to ears 24 formed on arcuate shoes 25 located in the chamber 11 of the side plate 8, the ends of the shoes 25 being spaced apart slightly. Secured to the exposed end of the sleeve 18 adjacent the side plate 14 is a ring 26 having an arm 28. With the arm 28 may be assembled any suitable means (not shown) whereby the ring, and consequently the sleeve 18 may be rotated at the will of an operator. The ring 26 may be held on the end of the sleeve 18 by means of a set screw 27.

Traction rods 29 slide in the passages 6 of the rim 1 and slide in openings 36 formed in the flange 12 of the side plate 8. The outer ends of the traction rods 29 are pointed as shown at 30, and lie between the tires 3. The inner ends of the traction rods 29 are provided with heads 31 located in the chamber 11 of the side plate 8 and bearing on the shoes 25. The heads 31 of the traction rods 29 are of sufficient extent to bridge the spaces between the ends of the shoes 25. Adjacent their outer ends, the traction rods carry abutments 32 slidable in the thimbles 5. Compression springs 33 are located in the thimbles 5, the inner ends of the springs bearing against abutments 32, and the outer ends of the springs engaging the rim 1. The rim 1 is connected with the hub 7 by means of spokes 34. The wheel comprising the rim 1, the hub 7 and the spokes 34 rotates on the axle 10, but the sleeve 8 does not rotate thereon. When the wheel rotates, the heads 31 at the inner ends of the traction rods 29 ride circumferentially on the shoes 25. When it is desired to advance the pointed ends 30 of the traction rods 29, the sleeve 18 is rotated by means of the arm 28, the links 21 moving the shoes 25, and consequently the traction rods 29, outwardly. During this operation, the springs 33 are compressed. When the shoes 25 are moved toward the axis of the axle 10 by means of the ring 26 and its arm 28, the springs 33 push the traction rods 29 inwardly. The thimbles 5 serve to prevent dirt from getting into the springs 33. As many traction rods 29 as is considered expedient may be employed, and there may be any desired number of traction rods to each of the shoes 25.

In Fig. 6 of the drawing, a slight modification in the invention is shown. In the said figure, the numeral 75 designates a tire, corresponding to the tire 3. The tire 75 may be pneumatic, and with this end in view it is provided with a longitudinal chamber 76, adapted to contain air under pressure.

When the rim 1 is rotating in one direction, and when the sleeve 18 is forcibly rotated in an opposite direction, the drag of the heads 31 of the traction rods 29 on the shoes 25 will be sufficient to cause the links 21 to move the shoes outwardly, the swinging movement of the links being limited by engagement with stops 100 on the flange 20.

Having thus described the invention, what is claimed is:—

1. In a device of the class described, a wheel including a rim, and a hub having a chamber; a sleeve rotatable in the hub; means under the control of an operator for rotating the sleeve; shoes located in the chamber; links pivotally connecting the shoes with the sleeve; and traction members slidable in the rim and the hub and bearing at their inner ends on the shoes.

2. In a device of the class described, a wheel comprising a rim and a hub, the hub being provided with a chamber; a sleeve journaled in the hub; means under the control of an operator for rotating the sleeve; shoes located in the chamber; links pivoted to the shoes and to the sleeves; traction members slidable in the hub and in the rim and bearing on the shoes; and spring means assembled with the rim and coacting with the traction members, to move the traction members inwardly.

In testimony that I claim the foregoing as my own, I have hereto affixed my signature in the presence of two witnesses.

WILLIAM H. WELLSTEED, Sr.

Witnesses:
JAMES FROST,
GRACE GALLAGHER.